July 2, 1963  E. V. BUNTING  3,095,933
HYDRAULIC CONTROL SYSTEM

Filed Feb. 23, 1960  3 Sheets-Sheet 1

INVENTOR.
ERNEST V. BUNTING
BY
Woefe, Hubbard, Voit & Osann
ATTORNEYS.

July 2, 1963  E. V. BUNTING  3,095,933
HYDRAULIC CONTROL SYSTEM
Filed Feb. 23, 1960  3 Sheets-Sheet 3

INVENTOR.
ERNEST V. BUNTING
BY Wolfe, Hubbard, Voit & Osann
ATTORNEYS.

3,095,933
HYDRAULIC CONTROL SYSTEM
Ernest V. Bunting, Detroit, Mich., assignor to Massey-Ferguson Inc., Racine, Wis., a corporation of Maryland
Filed Feb. 23, 1960, Ser. No. 10,126
13 Claims. (Cl. 172—491)

The invention relates to controls for hydraulic systems and particularly for hydraulic systems of the type provided in tractors for raising and lowering attached implements and for regulating their working depths. The present application is a continuation-in-part of my prior application Serial No. 551,921, filed December 8, 1955, now abandoned.

In tractor hydraulic systems of the above general character, a hydraulic actuator, usually in the form of a one-way ram, is commonly provided for raising and lowering the hitch linkage by which the implement is coupled to the tractor. To raise the linkage and attached implement, pressure fluid is supplied to the ram by a pump driven from the tractor engine. Lowering of the linkage and implement is effected by opening a discharge port so that fluid may be exhausted from the ram by the gravity load imposed on the hitch linkage. Such load is augmented by the downwardly acting forces imposed on the implement when it enters the ground and is pulled ahead by the tractor.

The controls customarily provided for maintaining the implement at a selected working depth include means adapted to respond to changes in the draft load on the attached implement and correspondingly actuate a control device, such as a valve for directing pressure fluid to or initiating exhaust of pressure fluid from the ram. It will be understood, of course, that provision is made for manually adjusting the controls to select the working depth to be maintained, such manual means also serving to condition the system for raising and lowering the implement between working and transport positions.

Such hydraulically operated hitch linkage systems also act to transfer to the tractor a portion of the weight and the downwardly acting forces imposed on the implement. This weight transfer increases traction on the tractor drive wheels and enables a relatively lightweight tractor to handle much larger and heavier implements than would otherwise be possible.

The basic system of that type with which the invention is concerned is shown in the Ferguson patent, No. 2,118,180, issued May 24, 1938. That system was originally designed with a draft responsive mechanism suited for a particular implement, specifically, a two-furrow plow. In the course of time substantially every type of ground working implement employed in farming, as well as other types of implements, have been modified or designed to adapt them for use with the hydraulically elevatable tractor hitch linkage. Additionally, larger and heavier implements have been designed with a view to increasing the operating efficiency of tractor-implement combinations. The widely differing characteristics as to weight, working depth, rate of penetration, etc., presented by the implements which a modern tractor is expected to accommodate introduce difficult problems in control.

Efforts to adapt tractor hydraulic systems of the above type to operate with maximum efficiency with a variety of implements has resulted in the development of means for varying the sensitivity of the controls, that is, the rate of response to changes in the controlling forces provided by different implements. Such adjustments, of course, affect both the implement raising and lowering actions of the hydraulic system. While, in general, the results are quite satisfactory, the mechanism required to produce those results is complicated and relatively expensive.

With the above in view, one object of the invention is to provide a much simpler and less expensive control organization capable of adapting tractor hydraulic systems for efficient operation with substantially any of the various implements commonly used with tractors and which can be quickly and easily incorporated in existing tractor hydraulic systems.

Deep working or heavy draft implements present additional problems in connection with the controls. Heavy draft implements generally require a large transfer of weight from the implement to the tractor to provide the necessary traction. This weight transfer takes place when the hydraulic system applies a lifting force to the hitch linkage. The weight transferred, of course, decreases when the ram is opened to exhaust to permit the linkage and implement to descend as when the implement is being pulled into the ground initially.

Some heavy draft implements as, for example, plows have a relatively flat angle of penetration and considerable forward motion is required to produce even a small increase in depth. Consequently, if the ram is permitted to exhaust more rapidly than called for by the rate of implement penetration, the weight and suction of the implement will be transferred directly to the soil instead of to the tractor and traction will be reduced. If the traction is reduced too much, the tractor drive wheels may spin and undercut themselves, thus lowering the rear end of the tractor, which changes the angle of penetration of the implement and further aggravates the situation.

Another serious problem is presented by heavy draft implements such as subsoilers and tillers which have a very steep angle of penetration. Implements of that type may penetrate to a considerable depth in a relatively short time interval and with very little forward motion. Once the ram has been opened to exhaust to put the implement to work, that condition prevails until the selected draft force is attained and the draft responsive mechanism closes the exhaust. The implement is then restrained against further downward movement relative to the tractor but it nevertheless tends to go deeper due to deflection of the pneumatic tires until the selected draft force is exceeded and the draft responsive mechanism starts the pump in action to supply pressure fluid to the ram for lifting the implement. Due to the slight lag in response of the controls, implements with such a high angle of penetration tend to go too deep and may even penetrate deep enough to stall the tractor.

Another object of the invention is to provide controls adapted to regulate the operation of the tractor hydraulic system so that the weight transfer to the tractor is not delayed until the selected draft load is developed but is maintained to a substantial degree while the implement is penetrating to the selected working depth. A related object is to provide improved controls operative to regulate the lowering of the implement coupling hitch in a manner such that all of the downwardly directed force of the implement not required for producing the optimum rate of penetration are transferred to the tractor to increase its traction. Another related object is to provide controls which effectively prevent the implement from overrunning or penetrating deeper than the selected working depth.

Still another object is to provide controls which eliminate the transitory conditions occurring in conventional controls when exhaust flow from the ram is initiated which tend to allow the implement to drop too quickly and lunge or chatter until equilibrium conditions are established. More specifically, it is an object of the invention to provide a control system including an auxiliary valve operative to regulate the discharge from the ram so that the pressure prevailing at the main control valve is maintained at a substantially constant level irrespective of the weight of the particular implement involved or the ground reaction forces imposed on the hydraulic system by the implement.

Another and more specific object is to provide an improved system of controls for a tractor hydraulic system operative to regulate the rate of penetration of an implement by maintaining fluid discharge from the hydraulic lift or ram substantially constant, irrespective of the pressure developed in the system by the weight of the implement and the downwardly directed forces acting upon it.

It is also an object of the invention to provide controls operative to prevent loss of fluid from the hydraulic system due to the momentary shock loads during transport of heavy implements.

Other objects and advantages of the invention will become apparent from the following detailed description of the preferred embodiments illustrated in the accompanying drawings, in which.

While preferred embodiments of the invention to a specific type of tractor hydraulic system have been shown by way of illustration, it is to be understood that this is not intended to limit the invention to those particular embodiments or to structural details of the exemplary valves. On the contrary, the intention is to cover all modifications and adaptations falling within the spirit and scope of the invention as more broadly or generally characterized in the appended claims.

Figure 1:
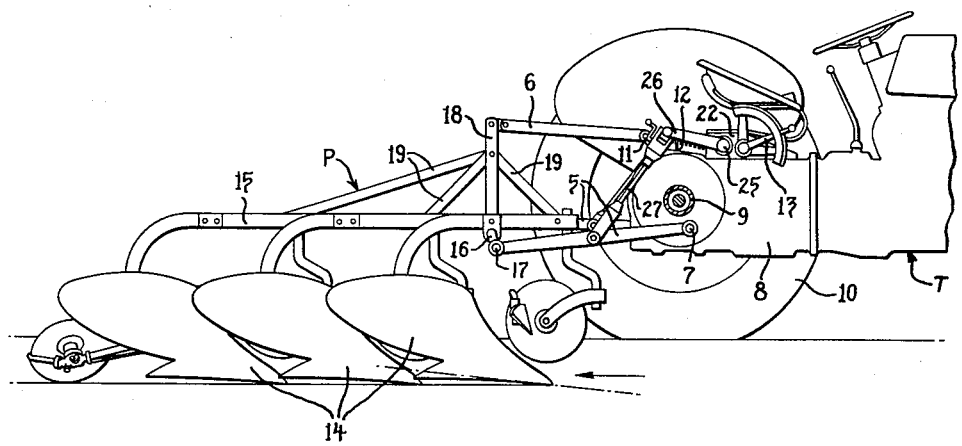
FIGURE 1 is a fragmentary side elevational view of a tractor with a plow coupled thereto by a hitch linkage powered by a hydraulic unit embodying the features of the invention, the plow being shown at working depth with maximum weight transfer from the implement to the tractor.

Referring to the drawings, there is shown in FIG. 1 a lightweight four wheeled tractor T which will be recognized by those skilled in the art as a "Ferguson" tractor. At the rear of the tractor is mounted a hitch linkage of the type disclosed in the previously mentioned Ferguson patent by which implements are coupled to the tractor for operation therewith as a unit. For raising and lowering the hitch linkage the tractor is equipped with a hydraulically operated power unit (see FIG. 3) of the general type disclosed in the above-mentioned Ferguson patent but in which has been incorporated the improved controls provided by the instant invention.

The implement hitch linkage of the exemplary tractor comprises a pair of lower or draft links 5 and a top or control link 6. The draft links are arranged side-by-side in laterally spaced relation and to converge forwardly. At their forward ends the links are pivoted as at 7 on the tractor center housing 8 for vertical swinging movement about a transverse horizontal axis. This axis is located below and slightly forwardly of the axis of the rear axle housing 9 on which the tractor's pneumatically tired rear drive wheels 10 are mounted.

The top link 6 is pivoted at its forward end to a rocker 11 pivotally mounted on the upper portion of the tractor center housing. Fore and aft movements of the top link are transmitted through the rocker and a control plunger (not shown) to control elements incorporated in the power unit. A main control spring 12 acting on the control plunger and rocker resists forward movement of the top link and serves to counterbalance the control force imposed on the link by the draft load on the implement. The top link 6 and a hand lever 13 pivoted on the tractor body cooperate to control the operation of the power unit as will appear presently.

The links 5 and 6 of the hitch are constructed to provide for universal pivotal connection of their rear ends to suitable connecting elements provided on any type of implement designed for use with a tractor. In FIG. 1 a conventional moldboard plow P has been shown coupled to the hitch linkage. This particular plow has three plow bases 14 carried by a frame structure including a plurality of beams 15 which are secured at their forward ends to a transverse drawbar 16. Pins 17 at opposite ends of the drawbar provide for connection with the draft links 5. Adjacent the forward end of the frame structure is mounted an upstanding strut 18 rigidly held in fixed relation to the structure by braces 19 and provided at its upper end with suitable means for pivotal connection with the trailing end of the top link 6.

Figure 2:
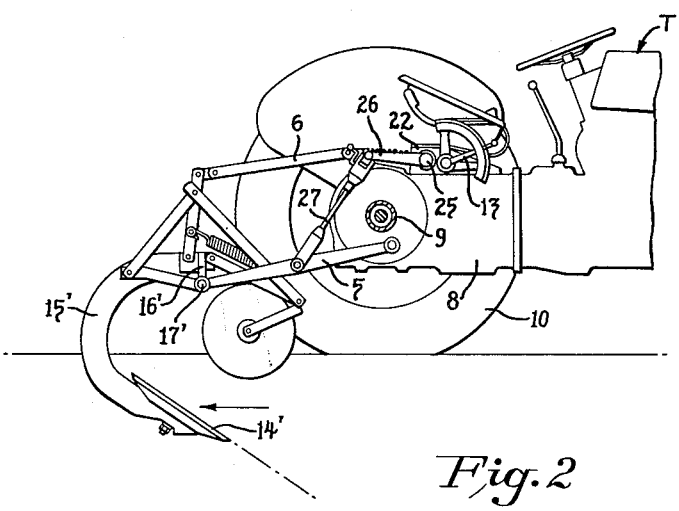
FIG. 2 is a view similar to FIG. 1 showing a subsoiler coupled to the tractor.

FIG. 2 shows an implement of the type commonly known as a subsoiler coupled to the tractor T. In this implement, a heavy C-shaped beam 15' carrying a ground engaging shareplate 14' is mounted on a drawbar 16' adapted to be connected to the draft links 5 by pins 17'. An upright similar to the strut 18 provides a connection with the top link 6.

Figure 3:
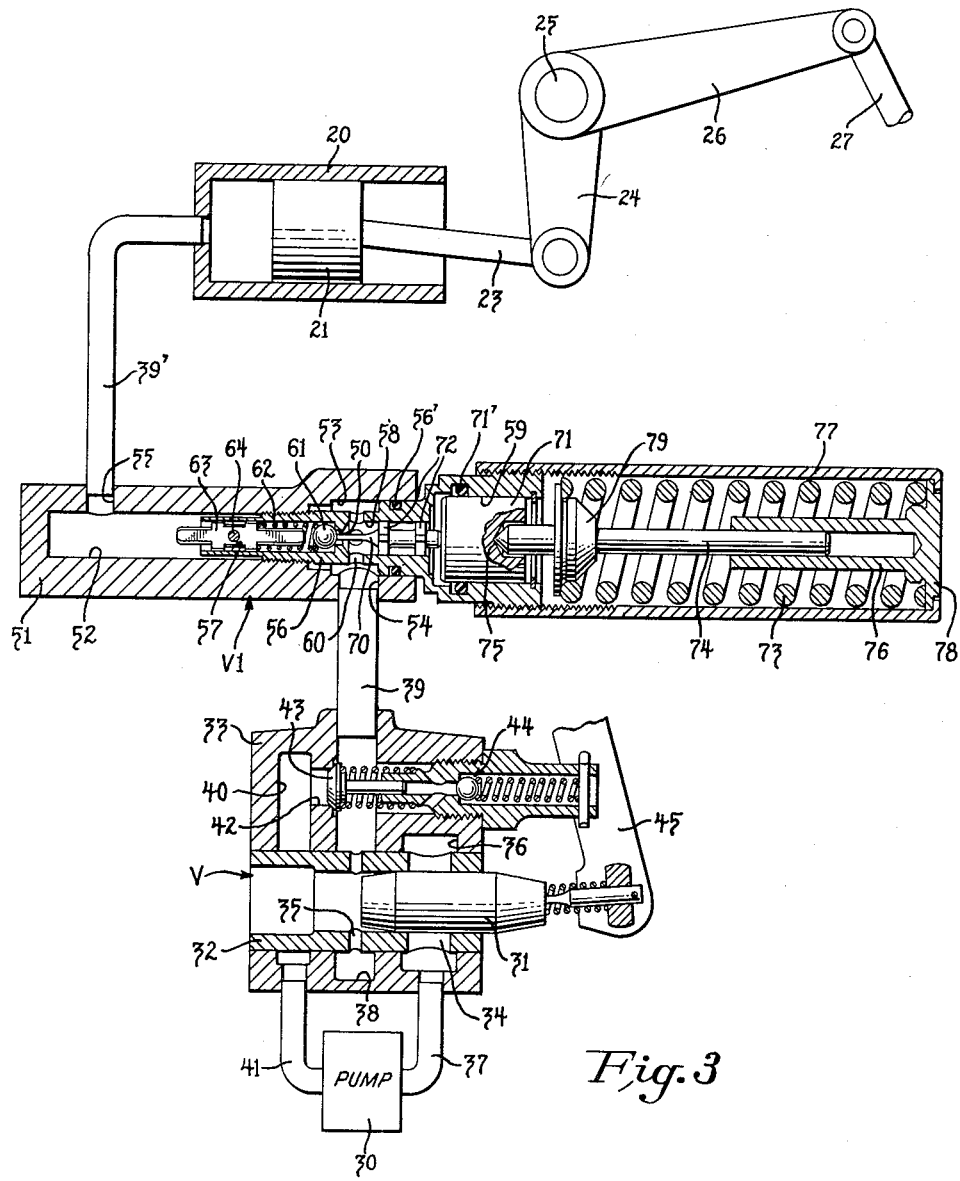
FIG. 3 is a partly diagrammatic sectional view of a hydraulic power unit for actuating the tractor hitch linkage equipped with one form of auxiliary valve.

Referring now to FIG. 3 of the drawings, the linkage actuating power unit of the exemplary tractor includes a pressure fluid operated actuator in the form of a one-way ram comprising a cylinder 20 fitted with a working piston 21. The cylinder is bolted or otherwise rigidly secured to the underside of a cover plate 22 (FIG. 1) closing an opening in the upper portion of the tractor center housing. The cylinder faces toward the rear of the tractor and its piston is connected by a rod 23 with one end of an arm 24 rigid with a transverse rock shaft 25 journaled on the cover plate 22. Crank arms 26, splined or otherwise nonrotatably fixed to opposite ends of the shaft 25 externally of the cover plate, are connected by drop links 27 with the respective draft links 5.

The introduction of fluid under pressure into the forward end of the ram cylinder 20 forces piston 21 rearwardly and rocks the shaft 25 in a direction effective to raise the draft links and the attached implement. Conversely, when fluid is permitted to exhaust from the ram cylinder, the piston is forced back into the cylinder and the links swing downwardly under the urging of the gravity load on the hitch linkage. When the ground working element or elements of the implement, that is, the plow bases 14 or share plate 14' are engaged in the soil, the gravity load urging the linkage downwardly is supplemented by the downwardly directed forces acting on the implement.

Pressure fluid such as oil, is supplied to the actuator or ram from a positive displacement pump 30 (FIG. 3) powered from the tractor engine in well known manner. This pump may, for example, be of substantially the form shown in the above-mentioned Ferguson patent. Delivery of fluid to and exhaust of fluid from the ram for raising and lowering the hitch linkage is controlled by valve mechanism V comprising a plunger 31 slidable in a valve sleeve 32 seated in a housing 33. The sleeve 32 is formed with two sets of ports 34 and 35 spaced apart axially of the sleeve so that both sets are closed when the plunger 31 is disposed in a central or neutral position. The port 34, which has a relatively large effective area, opens into a chamber 36 in the casing connected by a passage 37 with the intake side of the pump 30. Port 35, which has a relatively small effective area, opens into a chamber 38 connected by a conduit 39 with the closed end of the ram cylinder 20.

A third chamber 40 in the valve housing is connected with the discharge or pressure side of the pump 30 by way of a passage 41 and, in turn, communicates through a passage 42 with the chamber 38. A spring biased check valve 43 prevents reverse flow of fluid from the chamber 38 to the chamber 40 while permitting flow in the opposite direction. A spring loaded relief valve 44 provides for venting the chamber 38 in the event that the pressure in that chamber exceeds a predetermined value.

In the exemplary "Ferguson" tractor, the valve plunger 31 is shifted between neutral, "drop" and "raise" positions by a linkage including a floating lever 45 (FIG. 3) actuated by the control lever 13 or in response to movements of the top link 6 and the lever 13 jointly. The arrangement is such that when the hand lever is swung downwardly or toward the "drop" position in which it is shown in FIG. 1, the valve plunger is shifted to the right opening the "drop" port 35 to permit exhaust of fluid through the bore of the valve bushing 32 to the sump. In such movement the plunger 31, of course, maintains the pump intake port 34 closed so that the pump idles, that is, it operates without delivering fluid under pressure to the system.

In the conventional tractor hydraulic system, unrestricted communication is provided between the ram cylinder 20 and the drop port 35 so that fluid may discharge from the ram cylinder at a rate determined by the size of the port and the load on the hitch linkage. The port is usually sized to restrict the discharge somewhat and limit downward movement of the hitch linkage and implement to a safe rate precluding damage to the implement when it strikes the ground. Additionally, the tapered end of the valve plunger 31 has a metering effect on the discharge when the plunger is shifted only a slight distance from the neutral position. In either case, however, the volumetric rate of fluid discharge through the drop port 35 and consequently the rate of descent of the hitch linkage and implement will vary according to the pressure in the system which, of course, is determined by the weight of the implement and the ground reactive forces thereon which impose downwardly acting load on the hitch linkage.

When the hand lever 13 is swung upwardly toward the "raise" position, the valve plunger 31 is shifted to the left. It thus maintains the drop port 35 closed and opens the pump intake port 34. The pump then goes into action and delivers fluid under pressure to the ram cylinder 20 to raise the hitch linkage and attached implement. Means not shown here is provided in the commercial tractors for returning the valve plunger to neutral position when the hitch linkage is elevated to the transport position. In neutral position, both valve ports are closed so that the pump idles and fluid is locked in the ram cylinder to maintain the linkage in the raised position.

The action of the controls follows the above pattern when the implement enters the soil and penetrates to the working depth selected by the positioning of the lever 13. In that case, however, the control force for shifting the valve plunger is derived from the resistance opposed to the movement of the implement through the soil. The control force is transmitted through the top link 6 and lever 45 to the valve plunger. When the implement is working at the depth designated by the lever 13, ground reaction tending to tip the implement forwardly is balanced by the main control spring 12 and the valve plunger 31 is located in neutral position. An increase in ground reaction, as when the implement digs in deeper, results in a shift of the plunger to open the pump inlet port 34 and fluid is supplied to the ram cylinder to lift the hitch linkage and implement until the equilibrium of the system is restored.

Conversely, when the ground reaction on the implement decreases from that produced at the selected depth, the compression force on the main control spring is relieved, allowing the lever 45 to swing and shift the valve plunger 31 to drop position. The implement is thus permitted to descend or dig in deeper until the equilibrium of the system is reestablished and the valve plunger returned to neutral position.

With conventional controls of the above general character, it will be evident that a very heavy implement or one having a fast penetrating rate such as the subsoiler shown in FIG. 2 may overrun or penetrate too deep before the valve mechanism can take the necessary corrective action. Under such conditions, equilibrium is not attainable instantly but the valve mechanism may be shifted rapidly between drop and raise positions a number of times with consequent lunging and chattering of the implement and accompanying bucking and pitching of the tractor. This is particularly the case when the drop port 35 is fully open as when the force initiating a corrective action is relatively large.

In addition to the overrun due to inherent lag in the linkage system, the change in weight transfer that takes place when the selected working depth is reached also contributes to excessive implement penetration. Thus, the linkage sustaining action of the ram and consequently maximum weight transfer does not come into play until the drop port 35 is closed. This occurs when the control force on the top link attains the value designated by the setting of the lever 13. While the implement is entering the soil the tractor tires 10 are therefore deflected only a small amount, that is, substantially less than shown in FIG. 1. However, when full weight transfer begins the tires are further deflected, as shown in FIGS. 1 and 2, and the implement digs in deeper. The pump P therefore must pump enough fluid to compensate for this additional tire deflection, as well as to correct the overrun due to lag.

While overrunning may occur in a similar manner in the case of slow penetrating implements such as moldboard plows, a more serious problem is presented by the loss of weight transfer during entry of the plow. Thus, when the drop ports are fully open, weight transfer is at a minimum and unless the ports are dimensioned to provide a discharge rate closely coordinated with the rate of a penetration the implement weight will be transferred to the soil instead of to the tractor. This, of course, reduces the traction of the wheels 10 and if the plow is running relatively deep the traction loss may be sufficient to allow the wheels to spin so that the forward motion of the tractor stops. In such case, the balance point established by the setting of the lever 13 is never achieved.

In accordance with the invention the foregoing difficulties and others are completely avoided by the interposition of novel valve mechanism between the control valve V and the ram, which valve mechanism is operable to restrict the discharge from the ram so that the pressure at the discharge port 35 remains substantially constant to enable the main control valve to vent the fluid at a predetermined uniform volumetric rate, irrespective of the pressure developed in the ram by the load imposed on the linkage by the implement weight or the downward directed forces acting on the implement in its movement through the soil. The valve mechanism may be adjustable, that is, it may be settable for operation with any of a wide variety of implements and to provide for transfer to the tractor of a predetermined portion of the weight that is not required to produce the optimum rate of penetration of the particular implement coupled to the tractor. Alternatively, adjustability may be dispensed with and the valve mechanism provided with a spring designed to maintain a weight transfer of selected magnitude to the tractor irrespective of the implement coupled thereto. In either case traction is always maintained on the tractor drive wheels when it is needed and overrun or lunging and chatter of the implement is completely eliminated or reduced to an inconsequential amount.

FIG. 3 shows a tractor hydraulic system incorporating an auxiliary valve mechanism V1 of the adjustable type capable of restricting fluid flow from the ram to a volumetric rate adopted to maintain a selected constant pressure at the main control valve drop port 35 for substantially any pressure obtaining in the ram. The exemplary auxiliary valve mechanism is of the pressure reducing type in which the effective area of an orifice 50 is varied automatically to maintain a uniform pressure head at the discharge side of the orifice and thus maintain a constant rate of discharge from the ram through the main control valve for any section of the drop port of that valve. Accordingly, the ram piston 21 is constrained to move inwardly at a uniform controlled rate and the hitch linkage and attached implement therefore descend at a corresponding controlled rate.

Referring to FIG. 3 of the drawings, the auxiliary valve mechanism V1 as shown comprises a casing 51 having an elongated cylindrical bore 52 closed at one end and opening at the other through a stepped counterbore defining an enlarged chamber 53. To interpose the valve in a tractor hydraulic system, the pressure supply conduit 39 is cut at an intermediate point and the section leading from the control valve V is connected to a port 54 opening into the chamber 53. The other conduit section 39' leading to the ram cylinder 20 is connected to a port 55 opening into the bore 52 adjacent its closed end. The fluid passage between the control valve V and the ram cylinder 20 thus includes the two conduit sections, the bore 52 and the chamber 53.

The orifice 50, above mentioned, is interposed in the fluid passage between the bore 52 and the chamber 53 to control the rate of fluid flow therethrough. As herein shown, the orifice is formed in a transverse internal wall in an elongated body element 56 which has its small diameter end portion threaded into the bore 52 of the valve casing adjacent its junction with the chamber 53. The intermediate portion of the body is dimensioned for sealing fit with the walls of the chamber and an O-ring 56' effectively prevents leakage of fluid around the body. A passage 57 in the inner end portion of the valve body establishes communication between the orifice 50 and the interior of the bore 52. At the other side of the orifice, the body is formed with a passage 58 opening into a cylinder 59 formed in the enlarged outer end of the body and coaxially alined with the orifice 50. Suitable openings or ports 60 in the walls of the body establish communication between the passage 58 and the chamber 53 to which the pressure fluid supply and exhaust conduit section 39 is connected.

Fluid flow through the orifice 50 is controlled by a movable valve element 61 preferably in the form of a ball disposed in the passage 57 at the ram side of the orifice. The ball is urged into orifice closing position by a compression spring 62 interposed between the ball and a spring retainer and ball stop 63 fitted into the passage 53 and secured to the valve body as by a crosspin 64. As will be seen by reference to the drawing, the end portion of the retainer 63 extends through the spring 62 and defines an abutment or stop limiting the movement of the ball 61 away from the orifice.

It will be evident that with the above arrangement the spring 62 tends to hold the ball element 61 in a position to block fluid flow from the ram cylinder to the control valve V. When pressure fluid is supplied at the other side of the orifice, the spring yields and the ball retracts to permit substantially unrestricted fluid flow to the ram cylinders. To permit exhaust of fluid from the ram cylinder, means is provided for shifting the ball element 61 from its seat to open the orifice 50 varying amounts so as to establish a volumetric discharge therethrough effective to maintain a predetermined pressure at the discharge side of the orifice and therefore at the drop port 35 of the main control valve. The extent of such shifting of the valve member and consequently the effective orifice area provided for the discharge of fluid is controlled by suitable actuating means responsive to the pressure prevailing in the chamber 53 into which the conduit 39 opens. The pressure, of course, is determined by the discharge, if any, through the drop port 35 of the main control valve.

The ball shifting and pressure responsive means in its preferred form comprises a plunger 70 interposed between the ball 61 and the adjacent end of a piston 71 working in the cylinder 59. As explained above, the cylinder 59 communicates with the interior of the valve housing by way of the passage 58 and consequently the forward face of the piston 71 is subjected to the pressure obtaining in the passage. An O-ring 71' prevents leakage of fluid around the piston.

The plunger 70 is supported and guided for endwise movement in the passage 58 by axially spaced flanges 72 which have their marginal edges suitably relieved or flattened to permit substantially unrestricted passage of fluid to the cylinder 59. The forward end of the plunger, that is, the end coacting with the ball 61 is reduced to a relatively small diameter to avoid excessive restriction of the orifice 50 as the plunger advances to force the ball from its seat.

The piston 71 is urged in a valve opening direction by suitable spring means such as a compression spring 73. In the present instance, the spring is arranged to act between an abutment fixed with respect to the valve body and a pin 74 having a tapered point 75 at one end bearing against the rear or outer face of the piston. In the preferred form of the mechanism shown, the pin 74 is supported and guided for endwise movement in a tubular element 76 secured to a hollow shell 77 screw threaded on the projecting end of the valve body 56. As shown, the element 76 is formed with an integral head 78 which forms the abutment or seat for the adjacent end of the spring 73 and which has its marginal edge portion recessed for the reception of an internal flange formed on the shell 77. Accordingly, the spring seat may be advanced to tension or preload the spring by screwing the shell up on the valve body. A seat for the other end of the spring 73 is provided by a collar 79 suitably secured to the pin 74 intermediate its ends.

With the above arrangement, it will be seen that the spring 73 normally urges the piston 71 toward the inner end of the cylinder 59 and, through the plunger 70, tends to shift the ball 61 away from the orifice 50. The springs 62 and 73 are so proportioned that when the pressure in the chamber 53 at the discharge side of the orifice is low the piston will advance to the end of the cylinder or sufficiently close thereto to shift the ball 61 against the stop 63 and thereby open the orifice 50 to its full effective area. Fluid may then be exhausted from the ram cylinder at the maximum rate permitted by the prevailing pressure in the cylinder and the effective area of the drop port 35.

If, due to pressure in the ram, the volumetric flow rate is such that the drop port causes pressure to build up to a predetermined selected value at the discharge side of the orifice, such pressure acting on the piston 71 urges it rearwardly against the force exerted by the spring 73 and permits the ball 61 to move forwardly to throttle flow through the orifice 50. Accordingly, the piston will seek a position in which the pressure developed by the exhaust from the ram balances the force exerted by the spring 73. Thus, even though the load on the hitch linkage and consequently the pressure in the ram vary through a considerable range, the piston 71 will position the ball 61 so as to initiate the exhaust through the orifice 50 at a volumetric rate effective to maintain the selected pressure at the drop port for any given size or setting of that port. In other words, when the ram is heavily loaded and the pressure therein is high, the piston 71 will be forced rearwardly to effect reduction in the size of the orifice and consequent reduction of the volumetric rate of discharge dictated by the effective size of the drop port 35. Conversely, when the load on the ram is relatively light the piston 71 moves forwardly under the urge of the spring 73 to increase the effective area of the orifice and still maintain the volumetric rate of discharge required to provide the desired pressure at the drop port.

In operating the tractor with a moldboard plow such as that shown in FIG. 1 attached, the auxiliary valve mechanism V1 is adjusted to limit the exhaust of fluid from the actuator cylinder to a volumetric rate which will permit the hitch linkage and implement to descend at a rate slightly lower than the rate at which the plow bases penetrate the soil when the drop port is fully open. It will be understood, of course, that the rate of penetration is also dependent to a degree upon the speed at which the implement is pulled by the tractor. Adjustment is effected by screwing the shell 77 on or off the valve body to appropriately preload the control spring 73.

When the quadrant lever 13 is swung downwardly, the implement descends from transport position at the rate dictated by the setting of the valve mechanism. During the initial position of the descent, the orifice 50 is opened relatively wide since the fluid in the ram cylinder is pressurized only by the weight of the linkage and the implement.

As the plow bases enter the soil, the suck exerted thereon and the resistance to forward movement substantially increases the load on the ram and consequently raises the pressure in the hydraulic system. This tends to increase fluid flow through the orifice 50 and the piston 71 responds to change the position of the ball element 61 and maintain the volumetric discharge rate at the same constant value for any given size or setting of the discharge drop port 35. Since the mechanism is set to provide for descent at the implement penetrating rate, none of the force acting downwardly on the implement will be imposed on the soil, but all of the force in exces of that required to produce penetration will be transferred to the tractor to maintain traction on the drive wheels. Due to this force or weight transfer, considerable deflection will be imposed on the tractor tires before the control valve is called on to stop the descent of the implement. Consequently, overrun after the plow bottoms reach the selected depth, if any, will be very slight and relatively little pumping action will be required to establish equilibrium. Oscillation of the main control valve and consequent lunging and chattering of the implement is thus effectively eliminated.

Figure 4:
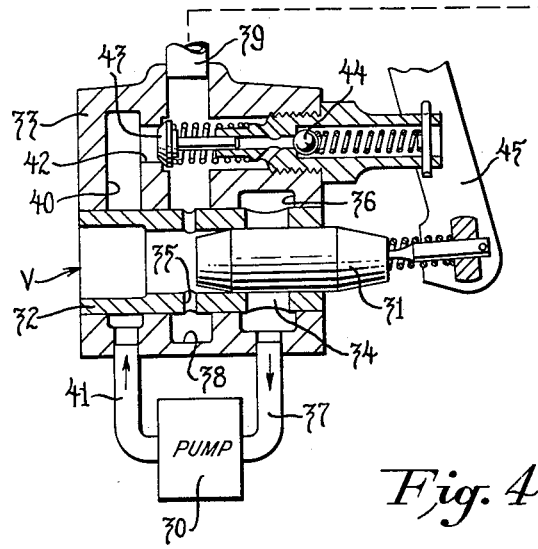
FIG. 4 is a partly diagrammatic sectional view of a hydraulic power unit equipped with a simplified form of auxiliary valve.

The operation of the tractor with implements having rapid penetrating characteristics, such as the subsoiler illustrated in FIGS. 3 and 4, will be correspondingly improved with the controls provided by the instant invention. Before operation is started, the auxiliary valve mechanism V1 is set by appropriately preloading the control spring 73, as above explained. Penetration of the share plate 14' will then proceed at the rate determined by the setting of the auxiliary valve mechanism and the effective area of the drop port 35. As the tendency of such implements is to penetrate rapidly, considerable downward force will be imposed on the linkage but this will be transferred to the tractor due to the maintenance of relatively high pressures in the hydraulic system due to the restricting action of the orifice 50. Such force transfer, of course, will serve to maintain ample traction on the drive wheels and impose substantial deflection on the tires so that overrun of the tool is reduced to a minimum. Stabilized operation at the desired depth is thus attained quickly and with a minimum of hunting or oscillation by the control valve. With either of the above types of implements, the controlling force for operating the main control valve will be attained quicker because the implement is forced to do more horizontal work on the soil due to the restriction of its rate of penetration.

It is to be particularly noted that the pressure imposed on the drop port 35 of the main control valve is never allowed to exceed a predetermined controlled value, that is, the cut-off pressure for which the auxiliary control valve is set. When the drop port of the main control valve is open, the auxiliary valve actuating means varies the effective area of the orifice 50 to maintain a volumetric discharge from the ram sufficient to accommodate the flow through the drop port and maintain the selected controlled pressure in the valve chamber 53 regardless of the pressure in the ram. It will be understood, of course, that under normal operating conditions ram pressure will usually exceed the control pressure. If the drop port area is changed, flow through the orifice is increased or decreased as required to maintain the controlled pressure at the port.

When the drop port 35 is closed completely to interrupt exhaust of fluid from the ram, the pressure fluid trapped in the chamber 53 causes the actuating mechanism to close the orifice 50. Such closure takes place when the pressure in the chamber reaches the predetermined controlled value and consequently the main control valve is isolated from the pressure prevailing in the ram. This is highly advantageous and materially improves the operation of the hydraulic system when a lowering of the hitch linkage is again called for. Thus as the main control valve opens the drop port 35 to initiate the lowering action there is no surge of pressure fluid through the port and no sudden drop or lunge of the linkage and attached implement. On the contrary, the initial opening of the drop port 35 allows the trapped fluid to flow smoothly and at a controlled rate from the chamber 53 until the reduced pressure in the chamber allows the actuating mechanism to shift the valve member 61 and open the orific 50.

Even when the main control valve is shifted substantially instantaneously from the closed to the fully open position there is no lunging or chattering of the implement as the exhaust fluid from the ram is metered through the drop port at a predetermined controlled pressure which has been selected to provide the optimum rate of implement penetration. The weight of the implement and the ground reaction forces imposed on it are without effect on the action of the controls. Regardless of the forces involved, the orifice 50 is always opened gradually and only enough to accommodate a flow rate effective to reestablish the predetermined controlled pressure level in the chamber 53. Lowering of the hitch linkage and any implement attached thereto starts and proceeds smoothly without jerks or chattering and precise control of the implement movements are maintained by the control valve.

FIG. 4 shows a conventional tractor hydraulic system in which there has been incorporated a modified form or, more specifically, a simplified form of auxiliary control valve V2. The hydraulic system shown includes the same linkage actuated power unit 20, 21, and the same main control valve V previously described. In this instance also, the auxiliary control valve V2 is interposed in the fluid supply conduit 39, 39' connecting the main control valve V with the actuator cylinder 20.

In the exemplary hydraulic system, the two sections 39 and 39' of the supply conduit are terminated in ports 81 and 82 formed in spaced members 83 and 84 which may constitute walls or partitions of the tractor center housing. The particular valve illustrated is designed for vertical mounting and the members 83 and 84 are accordingly shown disposed in vertically spaced relation with the member 83 containing the port 81 in the lower position.

In the preferred form illustrated the valve V2 comprises an elongated tubular body 85 having its lower end counterbored to receive a coupling element 86 dimensioned to telescope into the port 81. The coupling element is peripherally grooved adjacent opposite ends to receive O-rings 87 of resilient material for effecting a leakproof seal between the valve and the supporting structure.

While the other end of the valve body 85 may be connected to the port 82 in the manner above described, it is preferred to effect the connection through the medium of an extension tube 88 slidably fitted into the tubular body. The over-all effective length of the valve structure may therefore be adjusted as required to accommodate substantial variations in the spacing of the ported members 83 and 84. The extension member 88 as shown is fitted at opposite ends with coupling elements 89 adapted to fit respectively into the valve body and the port 82. Both coupling elements are grooved for O-rings 90 which provide a leakproof seal between the cooperating parts.

Intermediate its ends the valve body 85 is formed with an inwardly directed flange or shoulder portion 91 defining a valve port or orifice 92 disposed axially of the valve body. A valve element such as a ball 93 of steel or other suitable material having a diameter substantially larger than the diameter of the orifice is disposed in a position to be urged by gravity into closing relation to the orifice. A stop herein shown as interfitting crossed plates 94 is provided for preventing the ball from being carried away when fluid flows upwardly through the orifice. In the particular embodiment illustrated the stop is held against a shoulder in the valve body by a compression spring 95 interposed between the stop plates and the coupling element 89 in the adjacent end of the extension tube 88.

It will be evident that in the valve structure above described, fluid can flow freely through the valve body from the main control valve V to the actuator cylinder 20. However, fluid flow in the reverse direction is precluded since the valve member 93 blocks the orifice 92. Accordingly, to enable the auxiliary valve to perform its intended function, a by-pass for fluid flow around the blocked orifice is provided, the by-pass being normally open and adpted to be partially or fully closed by a spring biased pressure actuated valve member.

To provide for actuation of the by-pass controlling valve member, a sleeve-like member 96 is mounted on the valve body 85. Member 96 has an opening at one end adapted to fit tightly around the valve body and to cooperate with it to define an annular chamber 97. The sleeve member is restrained against movement axially of the valve body by a snap ring 98 positioned for engagement by the upper end of the sleeve and an O-ring 99 prevents leakage of fluid between the valve body and that end of the sleeve.

Radial ports 100 and 101 open from the valve body at the opposite sides of the orifice 92 into the pressure chamber 97. Fluid flow through the ports is controlled by a movable valve member 102 in the form of a sleeve slidably fitted between the valve body and the member 96 within the chamber 97. The valve member is dimensioned internally for a sliding but substantially leakproof fit with the valve body. Its lower end is also dimensioned externally for a similar fit with the member 96 so that the valve member in effect constitutes a piston working in a cylinder formed by the chamber 97. The coacting surfaces of the valve body, the sleeve and the valve member may be peripherally grooved to facilitate lubrication and to insure against leakage of fluid therebetween.

To provide communication between the valve ports 100 and 101 the interior of the valve member 102 is enlarged to define an annular passage 103 dimensioned axially to overlie both ports when the valve member is in the open position in which it is shown in FIG. 4. The valve member is urged toward and normally retained in the open position by spring means interposed between its lower end and the valve body. This spring means as shown comprises a coiled compression spring 104 encircling the valve body and seated at its lower end on a stop washer restrained against movement axially of the valve body by a snap ring 105. At its upper end the spring 104 bears against a flanged bushing 106 which abuts the lower end of the valve member 102, thus urging the valve member upwardly toward the open position in which it is shown.

With the valve member 102 of the auxiliary valve in open position as above described, the fluid is free to exhaust from the ram cylinder through the by-pass around the orifice 92 at the maximum rate permitted by the drop port 35 of the main control valve. The drop port, of course, imposes some restriction on fluid flow, thus tending to build up the pressure between the auxiliary valve and the main control valve. A portion of the fluid passing through the auxiliary valve is bled off from the passage 103 through an orifice 107 into the pressure chamber 97. Pressure is thus exerted on the upper end of the valve member 102 tending to shift it downwardly or toward a closed position against the force exerted by the spring 104. The pressure required to effect such movement is accurately predetermined by selection of the spring 104. If desired, provision may be made for adjusting the stop washer longitudinally of the valve body to vary the force exerted by the spring.

Figure 5:
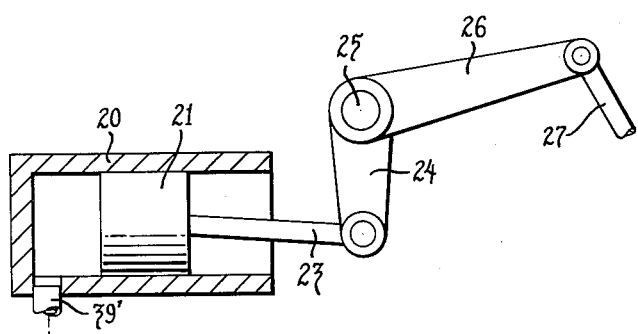
FIG. 5 is a fragmentary sectional view of the valve shown in FIG. 4 with the movable valve member shifted to restrict fluid flow through the valve.
Figure 5:
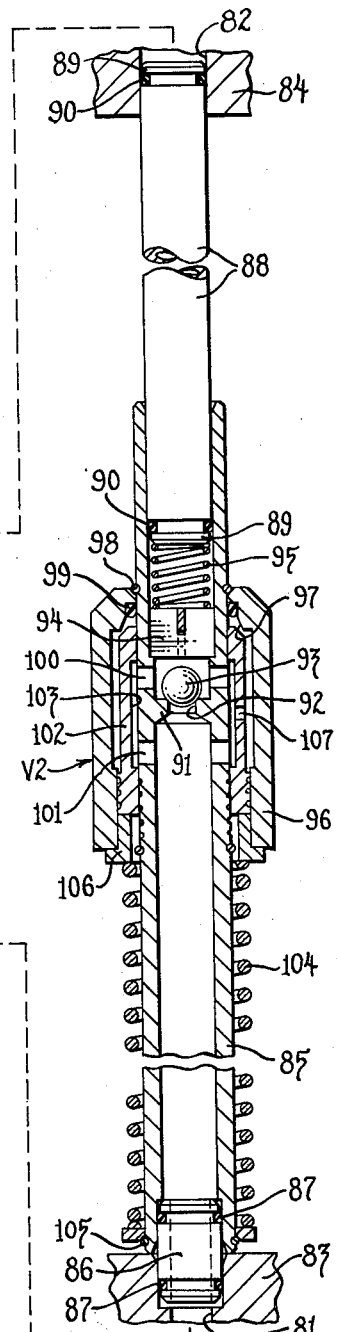
Figure 5:
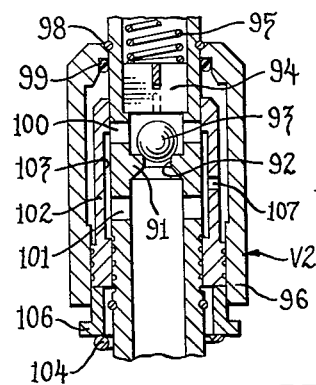

If the pressure in the ram cylinder is high due either to the weight of the implement attached to the hitch or to the ground reaction on the implement, the exhaust rate from the ram will tend to increase. This increase is reflected by a corresponding rise in the pressure at the drop port and in the chamber 97. Valve member 102 is therefore forced downwardly, compressing the spring 104 and partially closing the valve port 100 as shown in FIG. 5. Such movement of the valve member proceeds until the flow through the port 100 is throttled down sufficiently to balance the pressure in the chamber 97 against the force exerted by the spring 104 and the pressure developed through the restriction provided by the drop port 35. In other words, the valve member 102 will automatically take up a position to maintain the pressure at the drop port at or below the controlled pressure determined by the spring 104. The main control valve will therefore have a uniform metering action for all implements regardless of their weight or of the reaction force imposed thereon.

When the main control valve is closed and fluid flow through the drop port 35 interrupted, pressure builds up in the chamber 97 sufficiently to shift the valve member 102 down beyond the portion shown in FIG. 5 to the fully closed position. The main valve is therefore isolated from the pressure in the ram and no matter how high that pressure may rise, the pressure at the drop port remains at the controlled pressure level. Due to that isolation there can be no surge of high pressure fluid on initial opening of the main control valve and hence no sudden drop or lunge of the implement coupled to the hitch linkage. Implement descent starts smoothly and proceeds under precise control of the main valve so that overrunning or digging in too deeply with the accompanying chatter is completely eliminated. Moreover, downwardly acting forces in excess of those required to produce implement penetration are transferred to the tractor to load the drive wheels and increase their traction.

It will be apparent from the foregoing that the invention provides a simple and inexpensive control organization for tractor hydraulic systems which permits substantially any type of ground working implement to be operated at maximum efficiency. The improved controls provide much more accurate regulation of implement working depth and at the same time act to maintain ample traction on the tractor drive wheels when the implement is entering the soil. Overrun of rapid penetrating implements is reduced to a minimum and stable operation at the selected depth is quickly attained. The isolation of the main control valve from the pressure prevailing in the linkage elevating ram, which prevents the pressure at that valve from exceeding a predetermined controlled value regardless of the load on the linkage, precludes excessive surges of fluid when the valve is initially opened. Lunging of the implement coupled to the linkage and the chatter which accompanies such movements are completely eliminated. The mechanism required for attaining those new and useful results is simple and inexpensive. It is efficient and reliable in use and it can be incorporated easily in conventional tractor hydraulic systems.

I claim as my invention:

1. In an operating system for the vertically swingable implement hitch linkage of a tractor, in combination, a pressure fluid operated actuator mounted on the tractor and operatively connected with the linkage so as to transfer a portion of the load on the linkage to the drive wheels of the tractor, valve means operable to direct fluid under pressure to said actuator to raise the linkage and attachment implement, said valve means including a flow restricting orifice and being further operative to open said acuator to exhaust through said orifice to permit descent of the linkage and implement to working position, and adjustable means responsive to the pressure of the fluid at the inlet side of said orifice restricting the exhaust of fluid from said actuator to a predetermined maximum volumetric rate which is independent of the pressure developed in the actuator by the weight of the implement and the downwardly directed forces acting on it in its movement through the ground and which is effective to maintain a substantial transfer of the linkage load to the tractor drive wheels.

2. In an operating and control system for the vertically swingable implement hitch linkage of a tractor, in combination, a pressure fluid operated actuator mounted on the tractor and operatively connected to the linkage, main control valve means operable to direct fluid under pressure to said actuator to raise the linkage and implement attached thereto, said valve means including a flow restricting drop port and being further operative to vent said actuator to exhaust through said port to permit descent of the linkage and attached implement under the action of the load imposed on the linkage by the implement, and auxiliary valve means interposed between said actuator and said main valve means operative to restrict the exhaust of fluid from the ram to a rate such that the pressure of the fluid at the drop port is precluded from rising above a predetermined value whether the port is open or closed.

3. In an operating and control system for the vertically swingable implement hitch linkage of a tractor, in combination, a pressure fluid operated actuator mounted on the tractor and operatively connected to the linkage, main control valve means operable to direct fluid under pressure to said actuator to raise the linkage and implement attached thereto, said valve means including a flow restricting drop port and being further operative to vent said actuator to exhaust through said port to permit descent of the linkage and attached implement under the action of the load imposed on the linkage by the implement, and auxiliary valve means interposed between said actuator and said main valve means including a check valve permitting substantially unrestricted flow of fluid toward the actuator while blocking fluid flow in the reverse direction, means defining a by-pass around said check valve for accommodating fluid flow from the actuator, and means responsive to the pressure at the control valve side of said check valve for adjustably restricting the flow through said by-pass to prevent the pressure on the control valve from exceeding a predetermined level regardless of the pressure prevailing in the actuator and whether the control valve is open or closed.

4. In an operating and control system for the implement hitch linkage of a tractor, in combination, a pressure fluid operated actuator for said linkage, main control valve means operable to direct pressure fluid to said actuator to raise the linkage and implement attached thereto or to vent the actuator to exhaust to permit the linkage to descend under the influence of the load imposed on the actuator by the weight of the implement and the downwardly directed forces acting on the implement as it is drawn through the soil, and means interposed between said actuator and said valve means restricting exhaust fluid from the actuator to limt the pressure at the main valve whether open or closed to a predetermined level below the pressure prevailing in the actuator effective to preclude a sudden drop or lunge of the implement when the main valve is opened initially.

5. In an operating and control system for the implement hitch linkage of a tractor, in combination, a pressure fluid operated actuator for said linkage, main control valve means operable to direct pressure fluid to said actuator to raise the linkage and implement attached thereto or to vent the actuator to exhaust to permit the linkage to descend under the influence of the load imposed on the actuator by the weight of the implement and the downwardly directed forces acting on the implement as it is drawn through the soil, an auxiliary valve having an elongated tubular body defining a passage for the flow of fluid between said main valve means and said actuator, means within said body defining a valve port, a valve member cooperating with said port to prevent fluid flow from the actuator to the main valve while permitting fluid flow in the reverse direction, means supported on said valve body defining an annular chamber, exhaust ports opening through said valve body to said chamber at opposite sides of said first mentioned valve port to provide a by-pass for fluid exhausted from the actuator, a sleeve valve member slidable on the valve body relative to said exhaust ports to open or close the by-pass, spring means yieldably urging said sleeve valve member to open position, and a port in said sleeve valve member operative to bleed pressure fluid from the valve body into said chamber, the fluid in said chamber exerting pressure on said sleeve valve member in a direction to shift it toward a closed position against the force exerted by said spring means.

6. A pressure actuated valve comprising, in combination, an elongated tubular body, means intermediate the ends of said body restricting fluid flow thereto to one direction, a cylindrical member encircling said body, and with it defining a pressure chamber, ports opening from the body at opposite sides of said flow restraining means to said chamber to provide a by-pass for fluid flow around the restraining means, and a spring biased valve sleeve in said chamber slidable relative to the valve body to interrupt or establish fluid flow through said ports, said valve sleeve having a port operative to admit pressure fluid to said chamber for shifting the valve sleeve in a direction to interrupt fluid flow through the ports.

7. A pressure actuated valve comprising, in combination, an elongated tubular body, means intermediate the ends of said body restricting fluid flow thereto to one direction, a cylindrical member encircling said body, and with it defining a pressure chamber, ports opening from the body at opposite sides of said flow restraining means to said chamber to provide a by-pass for fluid flow around the restraining means, a sleeve-like member slidably fitted around said valve body and within said cylindrical member for reciprocation in said chamber, said sleeve-like member defining an internal passage operative to establish communication between said ports when in one position, spring means yieldably urging said sleeve-like member toward said one position, and means for introducing pressure fluid into said chamber to shift said sleeve-like member in a direction to interrupt communication between said ports.

8. A pressure actuated valve comprising in combination, an elongated tubular body, means intermediate the ends of said body restricting fluid flow thereto to one direction, a cylindrical member enclosing said body, and with it defining a pressure chamber, ports opening from the body at opposite sides of said flow restraining means to said chamber to provide a by-pass for fluid flow around the restraining means, a sleeve-like member slidably fitted around said valve body and within said cylindrical member for reciprocation in said chamber, said sleeve-like member defining an internal passage operative to establish communication between said ports when in one position, spring means yieldably urging said sleeve-like member toward said one position, and means for shifting said sleeve-like member in a direction to restrict fluid flow through said ports comprising passages for introducing pressure fluid from the discharge side of the valve body to said chamber.

9. In an operating and control system for the implement hitch linkage of a tractor, in combination, a pressure fluid operated actuator for said linkage, main control valve means operable to direct pressure fluid to said actuator to raise the hitch linkage and implement attached thereto or to vent the actuator to exhaust to permit the linkage to descend under the influence of the load imposed on the actuator by the weight of the implement and the downwardly directed forces acting on the implement as it is drawn through the soil, valve means interposed between said actuator and said control valve, said valve means including a spring loaded pressure responsive valve operative to close in response to a predetermined back pressure in the fluid trapped between the two valves upon closure of the control valve and to open in response to a temporary reduction in such back pressure upon opening of the control valve to initiate lowering of the hitch linkage, said pressure responsive valve thereafter being brought to a stabilized flow regulating position effective to establish a condition of equilibrium between the force exerted by the loading spring and the pressure of the fluid between the valves whereby to regulate the exhaust of fluid from the actuator and thereby determine the drop rate of the hitch linkage.

10. In an operating and control system for the implement hitch linkage of a tractor, in combination, a pressure fluid operated actuator for said linkage, main control valve means operable to direct pressure fluid to said acatuor to raise the hitch linkage and implement attached thereto or to vent the actuator to exhaust to permit the linkage to descend under the influence of the load imposed on the actuator by the weight of the implement and the downwardly directed forces acting on the implement as it is drawn through the soil, valve means interposed between said actuator and said control valve, said valve means including a pressure responsive valve operative to close in response to a predetermined back pressure in the fluid trapped between the two halves upon closure of the control valve and to open in response to a temporary reduction in such back pressure upon opening of the control valve to initiate lowering of the hitch linkage, said pressure responsive valve thereafter being brought to a stabilized flow regulating position by the greater increase in the pressure of the fluid between the valves in which position it is effective to regulate the exhaust of fluid from the actuator and thereby determine the drop rate of the linkage.

11. In an operating and control system for the implement hitch linkage of a tractor, in combination, a pressure fluid operated actuator for said linkage, means including a main control valve operable to direct pressure fluid to said actuator to raise the hitch linkage and implement attached thereto or to vent the actuator to exhaust to permit the linkage to descend under the influence of the load imposed on the actuator by the weight of the implement and the downwardly directed forces acting on the implement as it is drawn through the soil, and a flow regulating valve connected in series with the main valve for venting the actuator, an operating mechanism for said regulating valve arrangement responsive solely to pressure on said main valve to close the regulating valve on an increase in the pressure difference across said main valve and to open the regulating valve on a decrease in said pressure difference so that during the transition from full closure to actuator venting position of said main valve the flow rate from said actuator is controlled by said regulating valve to prevent abrupt descent of the implement.

12. In an operating and control system for the implement hitch linkage of a tractor, in combination, a pressure fluid operated actuator for said linkage, main control valve means operable to direct pressure fluid to said actuator to raise the hitch linkage and implement attached thereto or to vent the actuator to exhaust to permit the linkage to descend under the influence of the load imposed on the actuator by the weight of the implement and the downwardly directed forces acting on the implement as it is drawn through the soil, a regulating valve interposed between said actuator and said control valve means, said regulating valve being closed by back pressure between the regulating valve and the closed main control valve means when the latter is closed and being opened by the temporary reduction of fluid pressure caused by the opening of the main control valve means to drop the implement, the regulating valve being thereafter brought to a stabilized flow-regulating position which is fixed by equilibrium between the fluid pressure between said actuator and said main control valve means and an opposing resilient force, whereby the strength of said opposing force determines the drop speed.

13. In an operating and control system for the implement hitch linkage of a tractor, in combination, a pressure fluid operated actuator for said linkage, main control valve means operable to direct pressure fluid to said actuator to raise the hitch linkage and implement attached thereto or to vent the actuator to exhaust to permit the linkage to descend under the influence of the load imposed on the actuator by the weight of the implement and the downwardly directed forces acting on the implement as it is drawn through the soil, and a regulating valve in series with the main valve, said regulating valve being biased to open position and maintained in closed position by back pressure between the regulating valve and the main valve whenever the main valve is closed, whereby initial opening of the main valve to cause a descent of the implement is followed by opening movement of the regulating valve and abrupt descent is avoided.

References Cited in the file of this patent
UNITED STATES PATENTS

| | | |
|---|---|---|
| 2,118,180 | Ferguson | May 24, 1938 |
| 2,495,785 | Stephens | Jan. 31, 1950 |
| 2,611,306 | Strehlow | Sept. 23, 1952 |
| 2,785,660 | Jaseph | Mar. 19, 1957 |

FOREIGN PATENTS

| | | |
|---|---|---|
| 532,614 | Italy | Aug. 29, 1955 |

(British duplicate Pat. No. 747,674)